United States Patent
Jungwirth et al.

(10) Patent No.: US 6,322,281 B1
(45) Date of Patent: Nov. 27, 2001

(54) CORROSION-PROTECTED TENSION MEMBER OF STEEL

(75) Inventors: Dieter Jungwirth, Bad Heilbrunn; Erich Richartz, Grafing; Leo Werth, Lebach; Werner Rempe, Bergisch-Gladbach; Volker Müller, Saalfeld, all of (DE)

(73) Assignees: Dyckerhoff & Widmann Aktiengesellschaft, München; DWK Drahtwerk Köln GmbH, Köln; Bekaert-CMTM GmbH, Saalfeld, all of (DE)

(*) Notice: Subject to any disclaimer, the term of this patent is extended or adjusted under 35 U.S.C. 154(b) by 0 days.

(21) Appl. No.: 09/359,962

(22) Filed: Jul. 22, 1999

(30) Foreign Application Priority Data

Jul. 24, 1998 (DE) .................................. 198 33 332

(51) Int. Cl.[7] ........................................ E01D 11/00
(52) U.S. Cl. .................................. 403/278; 413/282
(58) Field of Search ...................... 403/270, 267, 403/265, 282, 273, 274, 275, 278, 383

(56) References Cited

U.S. PATENT DOCUMENTS

| | | | |
|---|---|---|---|
| 2,607,094 | * 8/1952 | Nicosia | 403/283 X |
| 3,267,539 | * 8/1966 | Mark | 403/275 |
| 3,646,748 | 3/1972 | Lang . | |
| 3,991,445 | * 11/1976 | Pennell | 403/275 X |
| 4,279,531 | * 7/1981 | McKenzie | 403/275 X |
| 4,662,134 | * 5/1987 | Illgner | 403/371 |
| 5,366,569 | * 11/1994 | Muller et al. | 148/525 |

FOREIGN PATENT DOCUMENTS

| | | |
|---|---|---|
| 3437107 | 1/1991 | (DE) . |
| 0323285 | 7/1989 | (EP) . |
| 0563735 | 10/1993 | (EP) . |

* cited by examiner

Primary Examiner—Lynne H. Browne
Assistant Examiner—John R. Cottingham
(74) Attorney, Agent, or Firm—Friedrich Kueffner

(57) ABSTRACT

A corrosion-protected tension member of steel composed of a plurality of individual wires twisted into a strand, wherein each of the individual wires of the strand is composed of a steel wire freed from deposits by a surface treatment and surrounded by a continuous sheathing of a corrosion-resistant sheet metal, wherein the sheathing is rigidly connected to the core wire by at least one common cold deforming process with intermediate annealing of the sheathing. The tension member of steel is used primarily as a reinforcement element or a tension member with wedge-type anchoring systems at its ends.

14 Claims, 2 Drawing Sheets

CORROSION-PROTECTED TENSION MEMBER OF STEEL

BACKGROUND OF THE INVENTION

1. Field of the Invention

The present invention relates to a corrosion-protected tension member of steel composed of a plurality of individual wires twisted into a strand. The invention also relates to a wedge-type anchoring system with such a tension member of steel.

2. Description of the Related Art

When building structures, especially structures subjected to environmental influences, the protection of steel components against corrosion has always posed problems. Reinforcement elements for reinforced steel are substantially protected against corrosion by the adhesion or bond with the concrete surrounding the elements and prestressing members for prestressed concrete with subsequent bonding are substantially protected against corrosion by pressing cement mortar into the sheathing tubes; however, the reinforcement elements or the prestressing members become components of the structure as a result and can only be separated therefrom by destruction. More recently, regulatory agencies overseeing construction require more and more frequently that tension members, particularly prestressing members, are accessible and, thus, controllable, and possibly also exchangeable, in order to be able to detect corrosion damage early and to repair the damage.

Strands of twisted steel wires are usually used for tension members for prestressed concrete which frequently also extend outside of the cross-section of the structure, as well as especially for highly stressed prestressing members, such as, stay cables of cable-stayed bridges. Such strands usually are composed of seven high-strength steel wires, wherein six outer wires are grouped around a straight central wire. Such strands are usually anchored by means of wedge-type anchoring systems.

Many tensioning methods used in prestressed concrete constructions are based on the principle of wedge-type anchoring. When the tensile force to be anchored is applied, the wedges usually composed of several wedge-shaped sectors are pulled by the tensile force in the direction of the prestressing member axis into a conical bore in an anchor body; this procedure is called slippage. As a result, clamping forces directed radially of the prestressing member axis are produced in the wedge-shaped sectors, wherein these clamping forces block the movement of the prestressing member. A requirement for this is that the coefficient of friction between the prestressing member and the wedge is greater than the coefficient of friction between the wedge and the conical bore. In order to ensure this, the inner surfaces of the wedge-shaped sectors are usually provided with a profiling, for example, a thread which is cut into the truncated cone-shaped wedge body before the wedge body is cut into the individual wedge-shaped sectors which are subsequently hardened.

Of course, an effective corrosion protection of such steel wire strands must also include the anchoring areas. Accordingly in the case of so-called grease strands, i.e., strands which are surrounded by grease for corrosion protection and are provided with a sheathing of an extruded casing of synthetic material, for example, PE (U.S. Pat. No. 3,646, 748), the corrosion protection extending over the free length of the strands must also continue into the anchoring units of the strands. This is achieved by having the ends of the PE casing removed at the ends of the strands over a certain distance extend into a chamber filled with grease (EP 0 323 285 B2). Aside from the fact that such a PE casing does not provide an absolute protection against mechanical damage, for example, when the strands are mounted, this type of corrosion protection requires a relatively complicated and, thus, expensive construction of the anchoring system.

It is also known in the art to provide reinforcement elements of steel with a coating of epoxy resin in order to protect them against corrosion. In order to anchor such strands by means of wedges, the wedges used for this purpose are those which have at the inner surface thereof a coarse toothing with dull or rounded-off tooth peaks, wherein the thickness of the coating and the height and inclination of the teeth are selected in such a way that the teeth peaks penetrate the coating and are pressed into the surface of the individual elements (DE 34 37 107 C2). As a result of the radial clamping force exerted by the wedges, the material of the coating is displaced; however, the portions of the surface of the strands not contacted by the teeth of the wedge are still coated, so that the penetration of oxygen to those areas is prevented where the wedge and the strand contact each other; in this manner, corrosion due to friction is to be prevented. However, a coating of epoxy resin does not provide an absolute mechanical protection; in addition, epoxy resin is heat-sensitive and may burn.

In accordance with another concept generally known in the art, a reinforcement element for concrete, or a strand, is protected against corrosion by surrounding the entire element over its entire length continuously by a protective metal sheathing (DE 29 44 878 A1). Similar to the grease strand described above, which is mechanically more resistant to a protective sheathing of metal, also in accordance with this proposal a protective layer and/or compensating layer is to be arranged between the surface of the reinforcement elements and the protective sheathing. As a result, a play remains between the tension member and the sheathing so that a wedge-type anchoring system poses at least some problems.

Finally, EP 0 563 735 A1 discloses a composite wire which is composed of a core of high-strength steel wire and a sheathing of longitudinally bent and longitudinally welded strip which is connected in a frictionally engaging manner to the core wire by means of a contact-type drawing process. Compared to the conventional steel wires protected against corrosion by galvanizing, by a PE casing or a coating of synthetic material, this composite wire has the advantage that the corrosion protection simultaneously produces a mechanical protection. Because of the rigid connection of the sheathing with the core wire, tensile strengths are achieved which are comparable to those of high-strength steel wires. However, this composite wire is only available as strand material.

SUMMARY OF THE INVENTION

Therefore, it is the primary object of the present invention to provide a tension member of steel, particularly for use in civil engineering, which ensures a high corrosion protection for different degrees of influences of corroding material and which can be manufactured and mounted economically, wherein the corrosion protection is resistant to mechanical stresses which are unavoidable under the severe conditions of construction, and wherein the corrosion protection is not only effective without additional measures over the free length but also in the anchoring area.

In accordance with the present invention, each of the individual wires of the strand is composed of a steel wire freed from deposits by a surface treatment and surrounded by a continuous sheathing of a corrosion-resistant sheet metal, wherein the sheathing is rigidly connected to the core wire by at least one common cold deforming process with intermediate annealing of the sheathing.

In accordance with the invention, this tension member of steel is to be used primarily as a reinforcement element or a tension member with wedge-type anchoring systems at its ends. Also, the invention is directed to a wedge-type anchoring system using such a tension member.

The present invention starts from the composite wire disclosed in EP 0 563 735 A1. The basic concept of the present invention is to use such a composite wire of a steel core wire and a sheathing of a corrosion-resistant metal connected in a positively engaging manner with the steel core wire as the initial product for the manufacture of a strand. It has been found against all expectations that as a result of the prior surface cleaning, on the one hand, and by the common or joint cold deforming with intermediate annealing of the metal sheathing, on the other hand, not only a mechanical engagement between the core wire and the sheathing is achieved in this composite wire, but also essentially a type of metallurgical connection. In addition, the composite wire is essentially not sensitive to transverse bending and transverse tension because the sheathing is relatively thick and relatively soft. Consequently, the composite wire can be easily processed to produce strands. It is particularly advantageous that each individual wire is separately protected against corrosion and it is not necessary, as it is the case in conventional strands, to provide the strand as a whole subsequently with corrosion-protecting measures with all the risks of possible defects.

The strand according to the invention is not only suitable as a reinforcement element for concrete, possibly also after providing measures which improve the bond or adhesion to the concrete, but primarily as a tension member, particularly a prestressing member in civil engineering, in which the tension force introduced into the tension member is transmitted at its ends by means of end anchoring systems.

A particular advantage of the invention is that the composite wires are equivalent to conventional strand wires with respect to their dimensions as well as with respect to their mechanical properties. A slight decrease of the cross-sectional area of the core wire, which is necessary if the nominal diameter is to be kept constant, is compensated by the subsequent common cold deformation of the core wire and sheathing, wherein the strength of the material of the sheathing is also increased. Consequently, no special rules with respect to dimension or treatment are required. Because of the good adhesion between the core wires and the sheathings of its individual elements, the usual anchoring systems, i.e., wedge-type anchoring systems, can be used for anchoring such a strand, wherein the corrosion protection provided over the free length is also available in the area of the anchoring system; this means that additional measures in the anchoring area, as they were required previously, are not necessary.

Especially in the case of wedge-type anchoring systems, another advantage of the use of strands composed of such composite wires as tension members, particularly as prestressing members, becomes apparent. When the thickness of the sheathing of the core wire and the height and the inclination of the teeth of the profiling of the wedge-shaped sectors are adapted to each other in such a way that the tooth peaks do not penetrate through the sheathing when the prestressing member is secured by a clamping action, the sheathing acts as a protective sheathing for the core wire against penetration as a result of the wedge action. This is the case when the peaks of the teeth penetrate into the sheathing by between half to two thirds of the thickness of the sheathing. As a result, the strand according to the present invention achieves in wedge-type anchoring systems an efficiency of almost 100%; such an efficiency cannot be achieved using any other known prestressing member. Consequently, the strand according to the present invention makes available a prestressing member with high resistance to vibration.

Another advantage is the fact that by an appropriate selection of the material for the sheathing of the individual wires it is possible to achieve a corrosion protection with various degrees of influence; various types of high-grade steels can be used for the sheathing as well as different metals ranging from aluminum to titanium. The corrosion protection achieved as a result is resistant to mechanical loads.

In accordance with an advantageous feature, in a wedge-type anchoring system for a strand according to the present invention, materials with a low potential difference are selected for the material of the sheathing of the wires and the material of the wedges in order to avoid gap or contact corrosion phenomena. If the sheathing of the wires is of high-grade steel, the wedge-shaped sectors should also be composed of high-grade steel, wherein, however, it must be ensured that the wedge-shaped sectors have a hardness at the tooth peaks which corresponds to conventional wedges of steel.

The various features of novelty which characterize the invention are pointed out with particularity in the claims annexed to and forming a part of the disclosure. For a better understanding of the invention, its operating advantages, specific objects attained by its use, reference should be had to the drawing and descriptive matter in which there are illustrated and described preferred embodiments of the invention.

DESCRIPTION OF THE PREFERRED EMBODIMENTS

Figure 1:
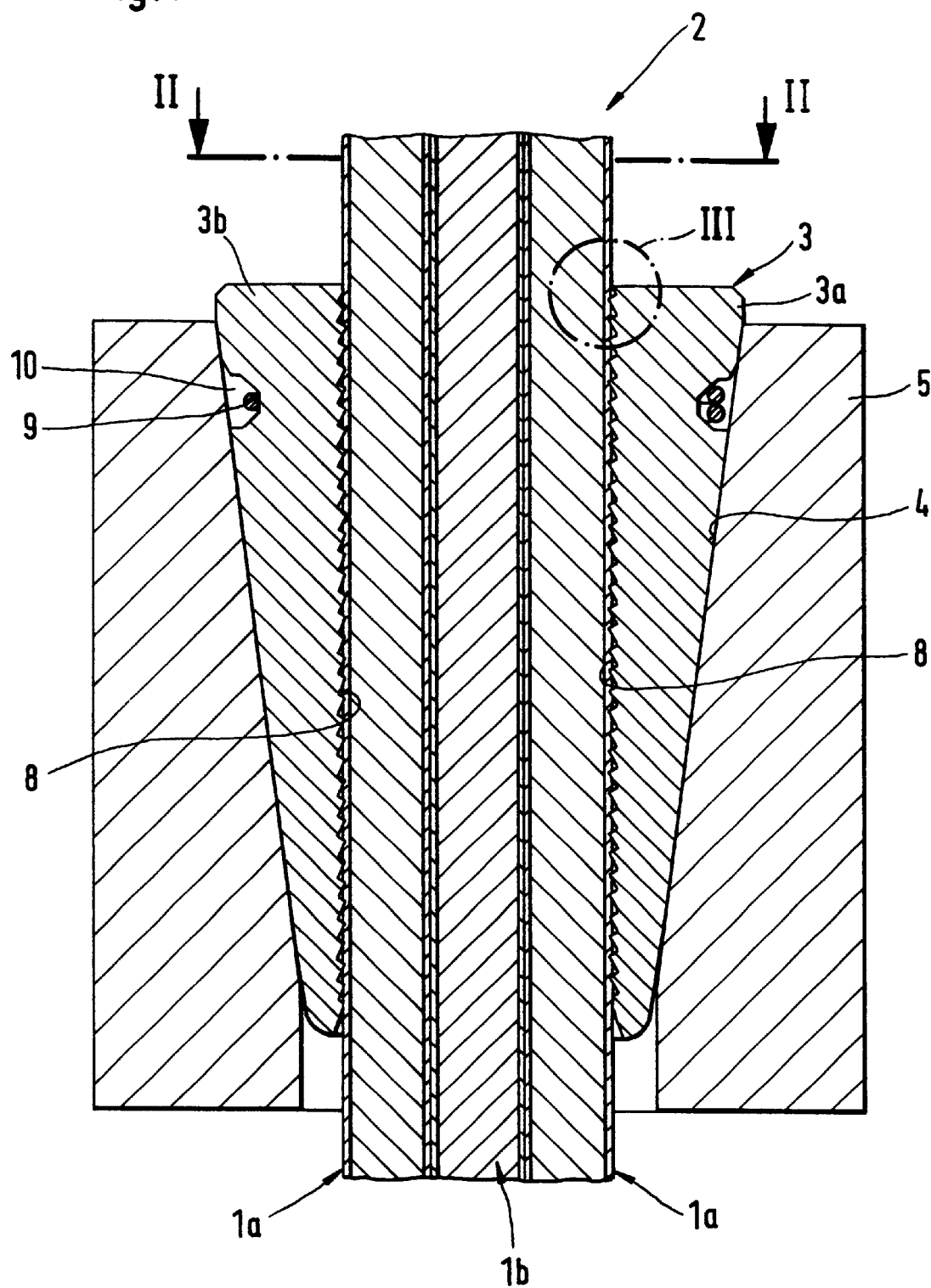
FIG. 1 is a longitudinal sectional view of a wedge-type anchoring system of a strand with a multiple-part annular wedge.
Figure 2:
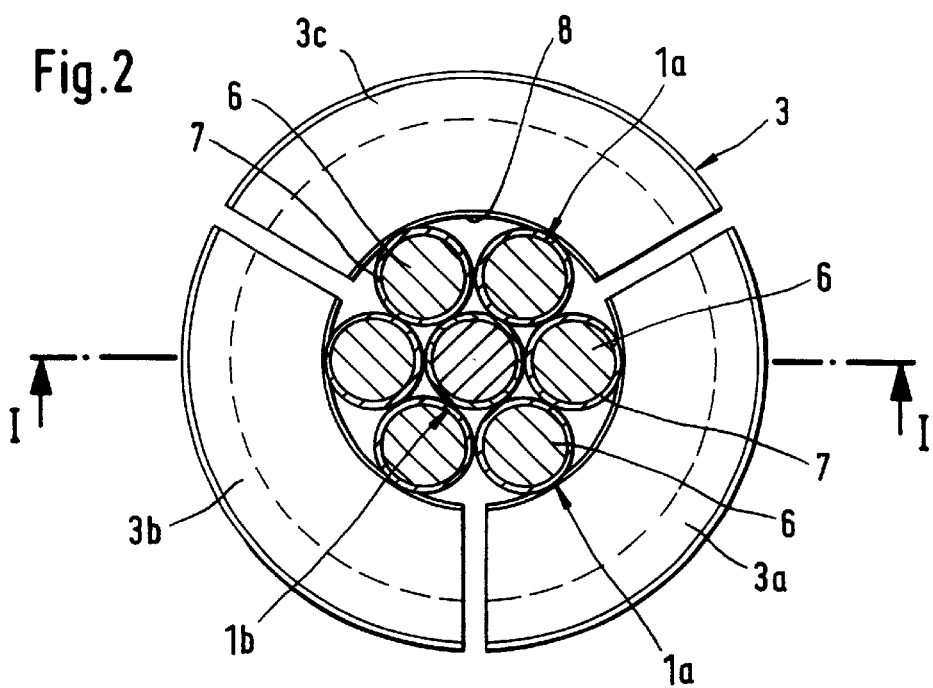
FIG. 2 is a tip view of the annular wedge of FIG. 1 in accordance with sectional line II—II of FIG. 1.

In the wedge-type anchoring system shown in FIG. 1 in a longitudinal sectional view along sectional line I—I of FIG. 2, a strand 2 composed in accordance with the present invention of composite wires 1 is anchored by means of a multiple-part annular wedge 3 in the conical bore 4 of a cylindrical anchoring body 5. The anchoring body 5 is either supported in the conventional manner against an abutment plate, not shown, or forms a component of an anchoring disc in which a plurality of conical bores 4 are provided.

In accordance with the invention, the strand 2 is composed, as already mentioned, of corrosion-protected composite wires 1, in particular those in accordance with European Patent Application 93 104 666.8 (EP 0 563 735 A1). For example, for manufacturing such a composite wire, a high-strength, patented and surface-treated steel wire 6 is sheathed in a continuous process by a strip of high-grade steel, wherein the strip is longitudinally welded to form a sheathing 7 and is firmly pressed against the core wire 6 in a first deformation step. The composite wire 1 is then drawn in successive drawing steps until it reaches its final dimension. At least between two deforming steps, a targeted annealing treatment of the composite wire is carried out by means of a rotating electric arc, wherein only the sheathing 7 of high-grade steel is heated to annealing temperature.

The strand 2 itself is composed of seven individual composite wires 1, i.e., six outer wires 1a which are grouped around a central wire 1b. The diameters of these composite wires correspond to those of conventional strand wires, so that the same equipment can be used for anchoring. For example, the central wire 1b has a total diameter of 5.5 mm and the outer wires 1a each have a diameter of 5.0 mm. The sheathing 7 of high-grade steel has a thickness of about 0.35 mm. This means that the core wire 6 has a diameter which is smaller than that of conventional strand wire by twice the thickness of the sheathing 7. The slightly smaller cross-sectional area of the core wire 6 is compensated by the common cold deformation with the sheathing.

The annular wedge 3 is composed of three wedge-shaped sectors 3a, 3b and 3c which are each provided with a toothing 8 at their inner surfaces facing the strand 2. The toothing 8 usually is composed of a thread which is cut into the truncated cone-shaped wedge body before it is cut into the individual wedge-shaped sectors 3a, 3b and 3c. The wedge-shaped sectors 3a, 3b and 3c are held together by a spring ring 9 which is placed in an annular groove 10.

Figure 3:
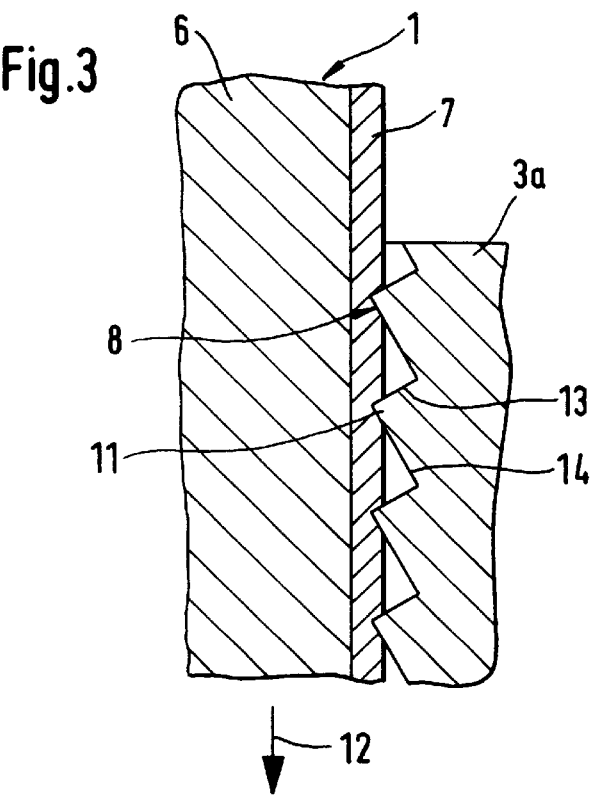
FIG. 3 is a sectional view showing detail III of FIG. 1.

As illustrated in FIG. 3, which shows the detail III of FIG. 1 on a larger scale, the teeth 11 of the toothing 8 are constructed asymmetrically. The sides 13 which face the direction of the force indicated by arrow 12 have a greater inclination, for example, of 60°, relative to the longitudinal axis of the strand 2, while the opposite sides 14 are inclined to a lesser extent, for example, by 30° relative to the longitudinal axis.

As also seen in FIG. 3, the peaks of the teeth 11 penetrate by about half their thickness into the sheathing 7 of high-grade steel without penetrating completely to the surface of the core wire 6. As a result of the pretreatment of the surface of the core wire 6 and the common cold deformation of sheathing 7 and core wire 6, the adhesion between the two components at their contact surface is so high that this constellation not only produces a problem-free transmission of the clamping force from the wedge, but also ensures that the core wire 6 is protected by the sheathing 7 in the same manner as a casing.

While specific embodiments of the invention have been shown and described in detail to illustrate the inventive principles, it will be understood that the invention may be embodied otherwise without departing from such principles.

We claim:

1. A corrosion-protected tension member of steel comprising a plurality of individual wires twisted around a core wire to form a strand, wherein each individual wire is comprised of a steel wire freed of deposits by a surface treatment and a continuous sheathing of a corrosion-resistant sheet metal surrounding the individual steel wire and extending over the length of the individual steel wire, and wherein the sheathing is connected and rigidly adheres to the core wire as a result of at least one common cold deforming process with an intermediate annealing of the sheathing.

2. The tension member accordance to claim 1, wherein the core wire is of a high-strength steel wire and the sheathing is of a high-grade steel.

3. The tension member according to claim 1, wherein the sheathing has a thickness of about 0.30 to 0.45 mm.

4. The tension member according to claim 1 as a reinforcement element for use in civil engineering, wherein profilings in the form of indentations are embossed in surfaces of the individual wires for improving adhesion of the element when embedding the element in concrete.

5. The tension element according to claim 1 as a tension member for use in civil engineering, comprising wedge-type anchoring systems at ends of the tension member for anchoring a tensile force introduced into the tension member.

6. A wedge-type anchoring system in combination with a tension member of steel composed of a plurality of individual wires twisted around a core wire to form a strand, wherein each individual wire is comprised of a steel wire freed of deposits by a surface treatment and a continuous sheathing of a corrosion-resistant sheet metal surrounding the individual steel wire, and wherein the sheathing is connected and rigidly adheres to the core wire as a result of at least one common cold deforming process with an intermediate annealing of the sheathing, the wedge-type anchoring system further comprising a multiple-part annular wedge comprised of individual wedge-shaped sectors arranged in a conical bore, wherein inner surfaces of the wedge-shaped sectors are profiled for engagement with the tension member, wherein the profiling is saw-tooth shaped with teeth having dull tooth peaks, wherein a thickness of the sheathing of the core wire and a height and inclination of the teeth of the profiling of each wedge-shaped sector are adapted to each other such that the tooth peaks do not penetrate through the sheathing when the tension member is secured with clamping action in the annular wedge.

7. The wedge-type anchoring system with tension member according to claim 6, wherein the tooth peaks penetrate by one half to two thirds of a thickness thereof into the sheathing.

8. The wedge-type anchoring system with tension member according to claim 6, wherein the teeth have a height of about 0.5 mm and a spacing between the teeth is about 1.0 to 1.25 mm.

9. The wedge-type anchoring system with tension member according to claim 6, wherein the teeth each have two sides with different inclinations.

10. The wedge-type anchoring system with tension member according to claim 9, wherein a side of each tooth facing a force application direction has a greater inclination.

11. The wedge-type anchoring system with tension member according to claim 10, wherein the side facing the force application direction has an inclination of 60° relative to the force application direction and another side of each tooth has an inclination of 30° relative to the force application direction.

12. The wedge-type anchoring system with tension member according to claim 6, wherein the wedge-shaped sectors are of a material with a corrosion behavior compatible with a material of the sheathing of the individual wires.

13. A. The wedge-type anchoring system with tension member according to claim 12, wherein the wedge-shaped sectors are of high-grade steel.

14. The tension element according to claim 1 for use as a prestressing member for prestressed concrete, comprising wedge-type anchoring systems at ends of the tension member for anchoring a tensile force introduced into the tension member.

* * * * *